United States Patent [19]

Körschen et al.

[11] Patent Number: 6,143,194
[45] Date of Patent: *Nov. 7, 2000

[54] MAGNETIC IRON OXIDE, PROCESS FOR ITS PRODUCTION AND THE USE THEREOF

[75] Inventors: Wolfgang Körschen, Moers; Ulrich Meisen, Krefeld, both of Germany

[73] Assignee: Bayer AG, Leverkusen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/946,545

[22] Filed: Oct. 7, 1997

[30] Foreign Application Priority Data

Oct. 15, 1996 [DE] Germany .............................. 196 42 534

[51] Int. Cl.[7] .............................. C09C 3/06; G03G 9/113
[52] U.S. Cl. ..................................... 252/62.56; 252/62.61; 252/62.6; 252/62.62; 252/62.63; 252/62.64; 106/456; 106/459; 428/403
[58] Field of Search ..................................... 252/62.6, 200, 252/62.61, 62.62, 62.63, 62.64, 62.56; 428/403; 106/456, 459, 31.92, 31.32, 31.33; 430/106.6, 109, 110, 903, 106, 137

[56] References Cited

U.S. PATENT DOCUMENTS

| 4,082,905 | 4/1978 | Stephan et al. ..................... 106/459 |
| 4,921,542 | 5/1990 | Rademachers et al. ............. 106/456 |

FOREIGN PATENT DOCUMENTS

| 262503 | 9/1987 | European Pat. Off. . |
| 262503 | 4/1988 | European Pat. Off. . |
| 3209469 | 9/1982 | Germany . |
| 51-44298 | 4/1976 | Japan . |

*Primary Examiner*—C. Melissa Koslow
*Attorney, Agent, or Firm*—Connolly Bove Lodge & Hutz LLP

[57] ABSTRACT

The invention relates to magnetite particles having an iron content of 45 to 73 wt. %, a process for their production and their use for the production of toners, printing inks and inks for ink jet printers.

3 Claims, No Drawings

MAGNETIC IRON OXIDE, PROCESS FOR ITS PRODUCTION AND THE USE THEREOF

This invention relates to magnetite particles having an iron content of 45 to 73 wt. %, a process for their production and their use for the production of toners, printing inks and inks for ink jet printers.

Particulate magnetites, which are produced from aqueous solutions by a precipitation process, have been known for a long time. The production of magnetite by precipitating iron(II) sulphate using an alkaline component and subsequent oxidation by air is described in U.S. Pat. No. 802,928. This process was the starting point for the subsequent development of numerous other variants of the procedure for producing magnetites by the precipitation process. These products have been used primarily for producing colorants of all kinds. The particular advantage of magnetites over organic pigments and carbon black lies in the very much better weatherability, so that colorants of this kind can also be used externally. Precipitated magnetites are also used for colouring precast concrete parts, such as concrete paving stones or concrete roofing tiles. For some time magnetites have also been used in electrophotography for the production of toners. Magnetites which have been produced by the precipitation process are particularly preferably used for the production of toners for photocopiers operating with one-component toners. The magnetic toner employed in photocopiers has to have various general properties. With the progressive development and improvement in photocopiers and printers, the requirements placed on the magnetic toner and consequently on the magnetite used for it have become ever higher. The latest generation of printers achieves a resolution of more than 600 dpi (dots per inch), which has led to the development of finely-divided toners having a narrow particle size distribution. As a result of this, the magnetites required for them must also have a very narrow particle size distribution. Moreover, a specific particle size is required so as to ensure a homogeneous distribution of the magnetite particles in the final toner. The magnetites must themselves have an electrical resistance sufficiently high to stabilise the latent image during the electrostatic transfer process. Moreover, coercivity, saturation magnetisation and remanent magnetisation must be in the correct relationship to the prevailing field strengths in the machine. In the photocopier, mainly two forces act on the toner, namely the magnetic attraction, established by saturation and remanence, and the triboelectric charge. A suitable toner for a specific photocopier must therefore respond to both forces. The magnetic properties of the iron oxide can be influenced by particle shape and particle size, that is, ultimately by the precipitation process. The triboelectric properties cannot be established so easily. To establish given charge potentials, in many cases transition metal complexes, especially chromium complexes, are used in the production of the toner. These materials are to some extent toxic and are distinguished by being relatively highly priced.

The production of magnetites by the precipitation process with the addition of silicon is described in JP 51 044 298 (Chemical Abstract). Pure precipitated magnetites can be produced without addition of foreign elements either in batches in accordance with DE-A 3 209 469 or continuously in accordance with DE-A 2 618 058. In the documents cited above, the iron(II) salt used is $FeSO_4$. It is also possible, however, to use other soluble iron(II) salts to produce a magnetite by the precipitation process. Thus the use of $FeCl_2$ is possible, as described in DE-A 3 004 718. The use of $FeSO_4$ or $FeCl_2$ has the advantage that both substances can be obtained in large quantities as waste products of the iron-processing industry. Besides sodium hydroxide, which is most commonly used, CaO or $CaCO_3$ (DE-A 3 004 718), ammonia (DE-A 2 460 493) or $Na_2CO_3$ (EP-A 187 331) may also be used as precipitating agents. Air is generally used as the oxidising agent. However, processes for oxidation using nitrates are also described (DD 216 040 and DD 284 478).

The production of magnetites containing Si is particularly advantageous as regards application in magnetic toners. These have a charge behaviour different from that of pure (nagnetites and exhibit a greater thermal stability at the same particle size. A process for producing particles of this kind is described in JP 61 034 070 (Chemical Abstract). Here the Si component is added to the iron(II) sulphate, which leads to precipitations of silica and consequently to an uneven distribution of the Si in the magnetite lattice. In U.S. Pat. No. 4,992,191, a magnetite containing from 0.1 to 5.0 At. % of Si, based on Fe, is claimed, which is said to be particularly suitable for producing toners. Numerous other specifications describing the production and use of Si-containing magnetites have subsequently appeared. Si-containing magnetites have been available commercially for more than 30 years.

The particle size and particle shape of magnetites can be controlled by the pH value during precipitation. Octahedra are obtained at high pH values and correspondingly low values for the ratio Fe(II)/NaOH (less than 0.47). These particles have relatively the highest coercivity and remanence. If magnetites are precipitated at a in the range of an Fe(II)/NaOH ratio of more than 0.48, increasingly round particles are obtained; these are distinguished by a very low remanence. Moreover, these particles are generally relatively fine in comparison with those of magnetites produced at other pH values. These correlations are described in Bull. Chem. Soc. Japan 47(7), 1974, 1646–50.

U.S. Pat. No. 5,401,313 describes surface-modified particles, which may also be used inter alia in toners. The particles contain at least one agent which modifies the electrical charge and at least one agent which promotes the dispersion. The particles used include metal oxides, for example, iron oxides.

U.S. Pat. No. 4,303,749 claims magnetic toners containing magnetic iron oxide. The iron oxide employed is treated with an organic titanate or with a coupling agent reactive with lecithin.

EP-A 533 069 describes magnetic toners and magnetic developers. A resin and a magnetic iron oxide which contains silicon are used for their production.

The object of the present invention was to provide a magnetic iron oxide having a high triboelectric charge-and at the same time the required narrow particle size distribution and the required particle size.

This object has been fulfilled by the magnetic iron oxides according to the invention, which contain specific additives/doping agents.

The invention provides magnetic iron oxides having an Fe content of from 45 to 73 wt. %, preferably of from 62 to 71 wt. %, most particularly preferably of from 67 to 71.5 wt. %, determined in accordance with DIN 55 913, a luminance (L*) of 45.0 to 65.0 CIELAB units, a colour cast (a*) of –0.5 to 1.5 CIELAB units, a colour cast (b*) of –1.0 to –7.0 CIELAB units and containing one or more supplementary compounds selected from the oxides, hydroxides, hydrated oxides, difficulty water-soluble and readily water-soluble salts of the metals lithium, sodium, potassium, magnesium, calcium, strontium, barium, manganese and zinc, from organic zirconium(IV) compounds, from organic cerium (IV) compounds and from organic tin(IV) compounds, in a quantity of from 0.1 to 5 wt. %, which increase the triboelectric charge of the starting material (without additive) by at least 30%, preferably by at least 50%.

The magnetic iron oxides according to the invention have an electric charge preferably of from −10 to +10 $\mu$C/g, particularly preferably from −5 to +10 $\mu$C/g, most particularly preferably from 0 to +10 $\mu$C/g.

Magnetic iron oxides generally have triboelectric charges of less than −5 $\mu$C/g. Iron oxides having triboelectric charges of greater than −5 $\mu$C/g occur sporadically; however these iron oxides frequently have poor color values.

The magnetic iron oxides according to the invention are preferably used for the production of toners, printing inks and inks for ink jet printers.

The invention also provides a process for producing the magnetic iron oxides according to the invention, which is characterised in that a magnetic iron oxide having an iron content of about 45 to about 73 wt. %, preferably of from 65 to 73 wt. %, particularly preferably of from 69 to 71.5 wt. % (determined in accordance with DIN 55 913), a luminance (L*) of 45.0 to 70.0 CIELAB units, a colour cast (a*) of −0.5 to 1.5 CIELAB units and a colour cast (b*) of −1.0 to −7.0 CIELAB units is provided, the supplementary compound complying with the above specifications is added in liquid or solid form, then well mixed and optionally dried.

The supplementary compounds are preferably added into an aqueous dispersion of the magnetic iron oxide according to the invention.

The magnetites according to the invention are preferably produced according to the following steps:
1. the placing of an alkaline component under protective gas
2. heating to precipitation temperature, with stirring
3. addition of an iron(II) component and the supplementary compound
4. heating to reaction temperature
5. oxidation by means of an oxidising agent to the required Fe(III) content However, the magnetites or spinel ferrites may also be produced by other known per se methods.

To achieve the required triboelectric charge, the supplementary compound may, depending on the nature of the additive, be added to the Fe(II) component during the precipitation or to the finally washed magnetite suspension.

The following substances are preferably used as additives:
oxides of the elements selected from Li, Na, K, Mg, Ca, Sr, Ba, Zn, Mn;
hydroxides or hydrated oxides of the elements selected from Li, Na, K, Mg, Ca, Sr, Ba, Zn, Mn;
difficultly water-soluble salts of the elements selected from Li, Na, K, Mg, Ca, Sr, Ba, Zn, Mn;
readily water-soluble salts of the elements selected from Li, Na, K, Mg, Ca, Sr, Ba, Zn, Mn;
organic zirconium (IV) compounds such as, for example, zirconium(IV) fatty acid esters;
organic cerium (IV) compounds such as, for example, cerium(IV) fatty acid esters;
organic tin(IV) compounds such as, for example, tin(IV) fatty acid esters.

The alkaline component used in the production of the magnetites is preferably an alkali hydroxide, an alkaline-earth hydroxide, an alkaline-earth oxide, an alkali carbonate or ammonia.

Iron(II) is typically used in the form of a water-soluble Fe(II) component, the use of $FeSO_4$ or $FeCl_2$ being particularly preferred. Other water-soluble Fe(II) compounds may however also be used. Atmospheric oxygen, pure oxygen, $H_2O_2$, alkali metal chlorate(V), alkali metal chlorate(VII) or nitrates may be used as the oxidising agent. For reasons of economy, the use of atmospheric oxygen, pure oxygen, $H_2O_2$ or sodium nitrate is particularly preferred.

The magnetic iron oxides produced by known methods (for example, one-step precipitation process; DE-A 3 209 469) generally have an Fe content of 45 to 73 wt. % (determined in accordance with DIN 55 913), depending upon the Fe(II) content and optionally on the content of doping elements. The triboelectric charge in these iron oxides is less than −2 $\mu$C/g (the method of measurement is given below). Magnetic iron oxides which have been produced by other known processes (for example, by reacting metallic iron with nitrobenzene) or by other precipitation or reduction processes generally have negative triboelectric charge potentials of about −5 $\mu$C/g. The magnetites produced by the process of oxidising iron with nitrobenzene frequently have a moisture absorption of more than 1.5 wt. % per 24 hours. Such high values may lead to undesirable changes in the properties of the toners in the course of production.

To produce the magnetic iron oxides according to the invention, a magnetic iron oxide is produced preferably by the one-step precipitation process.

This starting product, without addition of the supplementary compound, has a luminance (L*) of 45.0 to 70.0 CIELAB units, a colour cast (a*) of −0.5 to 1.5 CIELAB units, a colour cast (b*) of −1.0 to −7.0 CIELAB units, an iron content of 45 to 73 wt. % and a triboelectric charge of about −2 $\mu$C/g. Owing to the supplementary compound, a magnetic iron oxide containing 45 to 73 wt. % Fe and having a luminance (L*) of 45.0 to 65.0 is obtained. The alteration in the remaining optical properties is negligible. A particular advantage of the products according to the invention is that they absorb only small quantities of moisture. The triboelectric charge of the product is increased by at least 30% compared with the starting material.

The magnetic iron oxides according to the invention have a triboelectric charge preferably of −10 $\mu$C/g to +10 $\mu$C/g. Magnetic iron oxides having a triboelectric charge of 0 to 10 $\mu$C/g are particularly preferred, the triboelectric charge being determined by the method described in more detail below.

The doping necessary to produce the triboelectric charge can be carried out by adding water-soluble salts of the above-mentioned metals to the iron(II) component. It is also possible to use raw materials which already contain the necessary additives in the required quantities. Thus, for example, it is possible to use the spent acid which accumulates during the pickling of Mg-containing or Zn-containing steel and contains the appropriate quantities of Mg or Zn in addition to Fe. The additive may also be introduced, for example, in the form of oxides, hydrated oxides, hydroxides, difficultly-soluble salts of magnesium, of manganese, of calcium or of zinc, or in the form of the above-mentioned organic compounds, into the prepared magnetite suspension after washing and filtration and prior to drying. The required additive is introduced in the necessary quantity by means of a suitable metering device and is completely dispersed in the magnetite suspension by means of an efficient dispersing device. To prevent a separation during the drying process, the suspension is dispersed while being placed in the dryer.

The properties of the final magnetic iron oxides having iron contents of 45 to 73 wt. % are measured by the methods described below.

1. Measurement of the triboelectric charge in the pulverulent end product (as claimed in the claims)

0.5 g of the dry magnetic iron oxide is mixed with 9.5 g of a styrene-acrylic resin from the firm Degussa (type: VPOT 409) for 15 minutes in a 10 ml glass flask on a roller block at 60 min$^{-1}$ and charged. A quantity of approx. 100 mg is then removed, accurately weighed and placed in a blowoff type of powder charge measuring device (manufacturer: Toshiba Chem. Prod. Co. Ltd., Tokyo, type TB 200). The triboelectric charge is measured by blowing off with nitrogen at a pressure of 1 bar for 30 seconds. A carefully cleaned stainless steel screen having a mesh size of 60 $\mu$m is situated in the Faraday cage of the TB 200.

2. Tristimulus values are examined by preparing a paint.

For this purpose, 2.0 g of the binder Alkydal F48 (product of Bayer AG), 0.1 g of the magnetic iron oxide to be tested and 1.0 g of TiO$_2$ Bayertitan R-FK2 (product of Bayer AG) are ground in a muller (from the firm Engelsmann) having a loading of 2.5 kg and a diameter of 25 mm.

The tristimulus values are measured in accordance with ASTM E 308-90, D 3964, D 2244-89. The evaluation is carried out including the gloss and taking no mathematical account of the amount of gloss in the standard angle of observation (2°) under standard illuminant C. The spectral resolution of the measuring device used is 20 nm.

Before the measurement, 3.2 g of the magnetic iron oxide is ground on a Microdismembrator (30") (from the firm Braun) using an agate sphere of 10 mm in diameter.

3. The magnetic values (coercivity, specific saturation magnetisation, specific remanent magnetisation) are measured on a magnetic measuring apparatus (from Bayer AG) at a field strength of 5,000 Oe.

4. The BET surface area is measured in accordance with DIN 66 131.

Gas mixture: 90% He, 10% N$_2$

Measuring temperature: 77.4 K

Heating at 140° C., 60 minutes

5. Elemental analysis of Si, Mn, Ca, Mg, Zn, Na et cetera

The elements are determined by spectral analysis using ICP OES [Inductively Coupled Plasma Optical Emission Spectroscopy].

6. Elemental analysis of Fe, Fe(II), Fe(III)

Determinations are in accordance with, DIN 55 913. The Fe(II) content is determined by titration with KMnO$_4$ of a Memotitrator (Mettler DL-70). Fe(III) is similarly determined, using TiCl$_3$. The total iron content is calculated from the two separate values and the initially weighed portion. The contents of the two standard solutions are determined daily.

7. Particle shape, particle size

The particle size and particle shape are assessed from a micrograph taken with a transmission electron microscope (TEM) at a magnification of 30,000.

EXAMPLES

Example 1

A precipitated magnetite was produced by the method described in JP 51 044 298.

It had a triboelectric charge of −1.7 $\mu$C/g, as measured by the method described above.

2 wt. % of MgO, based on the magnetite, was added to a suspension containing 50 wt. % of the magnetite produced above and mixed by means of a dispersing device until a homogeneous dispersion was obtained. This dispersion was then dried and ground using a suitable grinding unit. The end product obtained had the following properties:

Luminance L* : 50.8 CIELAB units
a*: 0.6 CIELAB units
b*: −3.5 CIELAB units
Si content: 0.68 wt. %
Coercivity: 74 Oe
Particle size: 0.2 $\mu$m
Fe content: 68.6 wt. %
MgO content: 1.5 wt. %
Triboelectric charge: +1.6 $\mu$C/g Example 2

A precipitated magnetite was produced in an agitated tank by precipitating FeSO$_4$ with NaOH at pH 11.0 and at a precipitation temperature of 85° C. and subsequent oxidation with atmospheric oxygen at 85° C.

This precipitated magnetite had a triboelectric charge of −1.9 $\mu$C/g.

2 wt. % of MgO, based on the magnetite, was added to a suspension containing 50 wt. % of the magnetite produced above and mixed by means of a dispersing device until a homogeneous dispersion was obtained. This dispersion was then dried and ground using a suitable grinding unit. The end product obtained had the following properties:

Luminance L*: 58.4 CIELAB units
a*: −0.1 CIELAB units
b*: −5.9 CIELAB units
Si content: 0.01 wt. %
Coercivity: 93 Oe
Particle size: 0.3 $\mu$m
Fe content: 70.3 wt. %
MgO content: 1.6 wt. %
Triboelectric charge: +2.0 $\mu$C/g

What is claimed is:

1. A process for improving the triboelectric properties of magnetite particles which comprises combining magnetite particles consisting of magnetic iron oxide having an Fe content of 45 to 73% wt %, a luminance (L*) of 45.0 to 65.0 CIELAB units, a color cast (a*) of −0.5 to 1.5 CIELAB units, a color cast (b*) of −1.0 to −7.0 CIELAB units with one or more additional compounds from the group consisting of oxides, hydroxides and hydrated oxides of the metals lithium, sodium, potassium, magnesium, calcium, strontium, barium, manganese and zinc, in a quantity of 0.1 to 5% wt. %, which increase the triboelectric charge of the starting material not containing any additives by at least 30%.

2. The process of claim 1, wherein the additional compound is an oxide.

3. The process of claim 2, wherein the oxide is MgO.

* * * * *